US010827689B2

(12) United States Patent
Paans

(10) Patent No.: US 10,827,689 B2
(45) Date of Patent: Nov. 10, 2020

(54) CONVEYOR SYSTEM FOR PLANT CONTAINERS AND METHOD OF USE

(71) Applicant: ErfGoed Nederland B.V., GH Moerkapelle (NL)

(72) Inventor: Hugo Willem Lambertus Paans, GH Moerkapelle (NL)

(73) Assignee: ERFGOED NEDERLAND B.V., GH Moerkapelle (NL)

( * ) Notice: Subject to any disclaimer, the term of this patent is extended or adjusted under 35 U.S.C. 154(b) by 0 days.

(21) Appl. No.: 16/480,954

(22) PCT Filed: Jan. 26, 2018

(86) PCT No.: PCT/NL2018/050056
§ 371 (c)(1),
(2) Date: Jul. 25, 2019

(87) PCT Pub. No.: WO2018/139927
PCT Pub. Date: Aug. 2, 2018

(65) Prior Publication Data
US 2019/0387690 A1  Dec. 26, 2019

(30) Foreign Application Priority Data
Jan. 26, 2017  (NL) ...................................... 2018237

(51) Int. Cl.
*A01G 9/08* (2006.01)
*B65G 15/62* (2006.01)
(Continued)

(52) U.S. Cl.
CPC ............. *A01G 9/088* (2013.01); *B65G 15/62* (2013.01); *B65G 21/14* (2013.01); *A01G 9/143* (2013.01); *B65G 41/008* (2013.01)

(58) Field of Classification Search
CPC ........ A01G 9/088; B65G 21/14; B65G 15/62; B65G 41/008; Y02A 40/252
See application file for complete search history.

(56) References Cited

U.S. PATENT DOCUMENTS 2,576,217 A * 11/1951 Smith ..................... B65G 21/14
                                                      198/313
3,228,516 A   1/1966 Sheehan
(Continued)

FOREIGN PATENT DOCUMENTS

BE   1018390   10/2010
NL   7908174    6/1981
(Continued)

OTHER PUBLICATIONS

International Search Report for PCT/NL2018/050056 dated May 23, 2018 (3 pages).

*Primary Examiner* — Mark A Deuble
(74) *Attorney, Agent, or Firm* — Tutunjian & Bitetto, P.C.

(57) ABSTRACT

A belt conveyor system for the transporting of plant containers over a cultivation floor including an endless belt on which the plant containers are adapted to be placed, a mobile unit, provided with a buffer which is adapted to buffer the endless belt, and a drive unit to place the endless belt in operation, a reversal device provided with a reversal member, which reversal device is adapted to be placed on the field of the cultivation floor at a distance from the mobile unit; and a temporarily arranged belt guide which is adapted to be placed between the mobile unit and the reversal device on the field of the cultivation floor; wherein the reversal device turns the belt, and wherein the belt runs between the mobile unit and the reversal device across the belt guide.

13 Claims, 5 Drawing Sheets

(51) Int. Cl.
*B65G 21/14* (2006.01)
*A01G 9/14* (2006.01)
*B65G 41/00* (2006.01)

(56) References Cited

U.S. PATENT DOCUMENTS

| | | | | |
|---|---|---|---|---|
| 5,046,603 | A * | 9/1991 | Odenthal | B65H 29/36 |
| | | | | 198/812 |
| 5,366,068 | A * | 11/1994 | Hall | B65G 21/14 |
| | | | | 198/313 |
| 5,636,728 | A * | 6/1997 | Best | B65G 13/12 |
| | | | | 193/35 TE |
| 5,938,004 | A * | 8/1999 | Roberts | B65G 21/14 |
| | | | | 198/594 |
| 8,151,968 | B2 * | 4/2012 | Bremhorst | B65G 15/26 |
| | | | | 198/313 |
| 8,833,539 | B2 * | 9/2014 | Fehr | B65G 21/14 |
| | | | | 198/313 |

FOREIGN PATENT DOCUMENTS

| | | |
|---|---|---|
| NL | 9201882 | 5/1994 |
| NL | 1021762 | 6/2003 |
| NL | 2010290 | 8/2014 |
| NL | 2010291 | 8/2014 |
| NL | 2012248 | 8/2015 |

\* cited by examiner

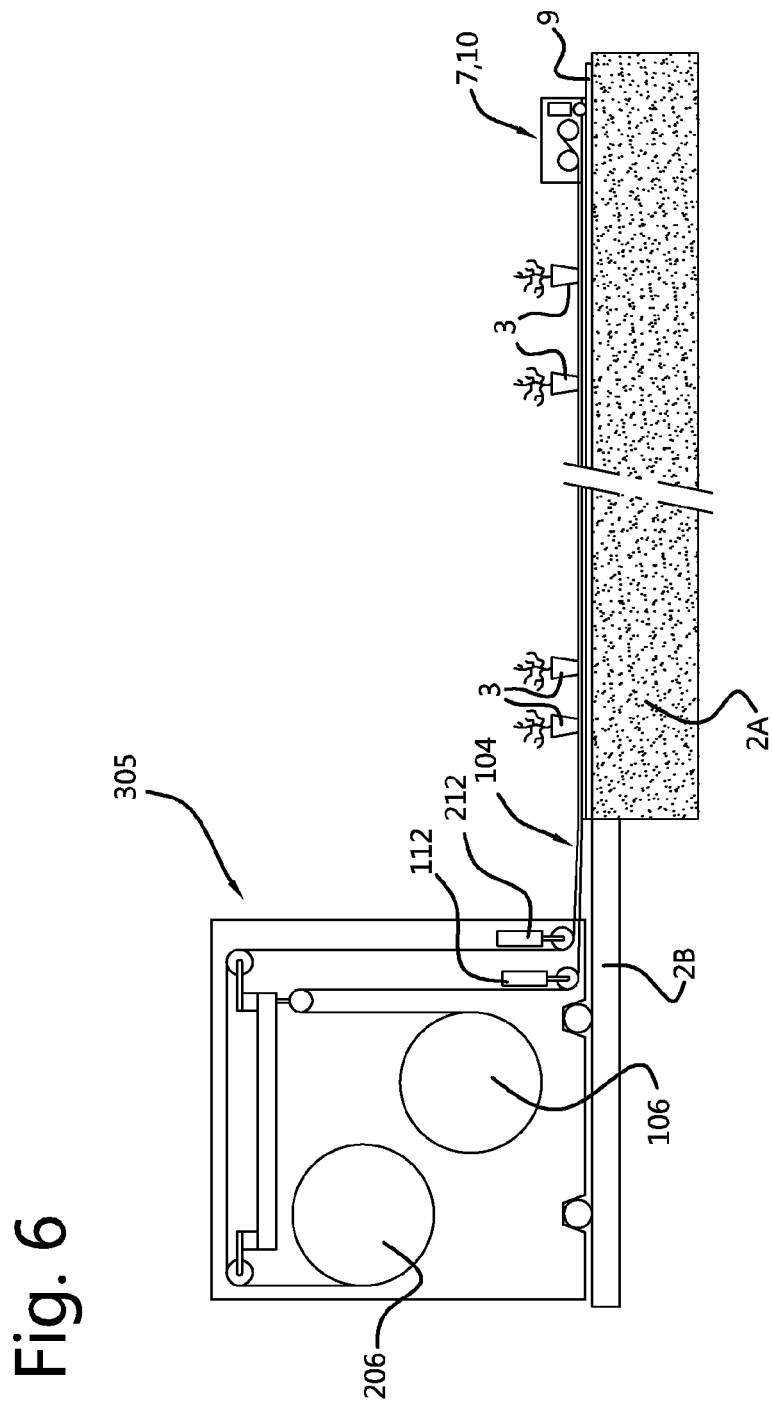

CONVEYOR SYSTEM FOR PLANT CONTAINERS AND METHOD OF USE

FIELD OF THE INVENTION

The invention relates to a belt conveyor system for the transporting of plant containers over a cultivation floor in horticulture, for example, such as in a greenhouse.

BACKGROUND OF THE INVENTION

Various belt conveyors are known for the transportation of plant containers to be placed on a cultivation floor. In a known belt conveyor system, a permanently present belt conveyor layout is arranged along a field of the cultivation floor. A major drawback to a permanent layout is that it constantly occupies a portion of the floor surface of the cultivation floor, so that this floor surface can never be used for placing plant containers on the cultivation floor, and thus the floor surface of the cultivation floor cannot be used efficiently. Another drawback to a permanent layout is that the conveyor is ordinarily used only a limited number of times a year, so that bearings and other moving parts of such a fixed belt conveyor have a reduced operation after a relatively long period of standstill. For this reason, permanent belt conveyors in this industry are usually started up every couple of days or every week, without moving any plant containers, in order to prevent the impaired operation as a result of standstill of the moving parts. This leads to needless operations and effort of the work force. Another drawback to such a permanent belt conveyor is that excessive wear occurs on components of the conveyor as a result of their exposure to water and nutrient salts which are needed for the plants to grow optimally on the cultivation field. Yet another drawback is that a fixed belt conveyor casts a shadow on nearby plants. Accordingly, this causes unequal growth (due to the light) and moisture, for example because there is less drying on the shadow side.

A known belt conveyor is described in NL7908174. This belt conveyor comprises foldable coupled frame pieces, and an endless conveyor belt is arranged along the top and bottom sides of the frame pieces. The frame pieces hang from a pipe of the greenhouse which runs high above the ground.

NL9201882 describes a layout for automating a potted plant nursery. In this layout, the harvest field is divided into different compartments, wherein pick-up and setting-out vehicles are provided which can automatically transport potted plants from one compartment to another. One drawback to such a layout is the dividing of the cultivation floor into compartments, where the width of the compartments is dependent on the width of the pick-up and setting-out vehicles. Whenever such a layout is used in an already existing greenhouse, it requires an adapted width of the setting-out vehicles and a relatively costly layout. A further drawback is that the pick-up and setting-out vehicles can only carry a limited number of plant containers per movement, and therefore the harvesting of plant containers is relatively slow.

SUMMARY OF THE INVENTION

The goal of the invention is to create an effective belt conveyor system for the transporting of plant containers, such as in a greenhouse.

The goal is achieved according to the invention in a first embodiment by a belt conveyor system according to the present application.

In a second embodiment, the invention provides a belt conveyor system according to the present application.

A benefit of the belt conveyor systems according to the invention is that little or no permanent transport infrastructure needs to be present at each field of the cultivation floor, for example in a greenhouse, in order to make possible the transporting of plant containers to the field or from the field. Thanks to the absence of such permanent infrastructure, the entire surface of the cultivation floor can be used for the cultivating of plants, which may result in a higher yield and an improved efficiency per unit of field surface. The division of the cultivation floor is also entirely free when using a belt conveyor system according to the invention.

The plant containers may be individual pots, for example made of plastic, in which always only one plant is growing, but the invention may for example also be applied to the use of trays, for example trays of the type where each tray has several cavities which are filled with growth substrate, such as potting soil, as is customary for example in the growing of strawberries, or trays which hold several separate pots.

The temporary guide for the belt only needs to be placed on the cultivation floor when its use is needed and thus when it is removed in the meantime it takes up no unnecessary cultivation floor surface and/or has no detrimental effect on the development of the growing plants, such as a shadow effect, influence on the watering, local moisture, etc.

During the growing, the plant containers stand on the field of the cultivation floor and not on the belt. For example, the plant containers stand on a water-permeable top cloth of a porous floor structure, such as a system with ebb and flood conditions.

It is possible to use the belt conveyor systems according to the invention in their operating condition in order to remove plant containers from a field of a cultivation floor, or to bring plant containers onto a field of a cultivation floor, while the belt conveyor system in the stowing condition will be removed from it. If plant containers then need to be removed from another field, or in fact brought to it, the belt conveyor system is moved to the other field and again placed in the operating condition in order to then remove plant containers from this other field or place plant containers on this other field. After this, the belt conveyor system can again be placed in a stowing condition and moved to another field, etc. In principle, a grower can thus make do with one or a couple of these belt conveyor systems to make possible the transport for a large number of fields. Moreover, a field does not need to be physically demarcated from another field; a field in the context of this invention may also be a portion of a larger cultivation floor without demarcation of the field itself.

Because the belt of the belt conveyor system runs over the temporary belt guide, no permanent infrastructure other than the belt guide temporarily put in place is needed for the use of the belt conveyor system. It is also advantageous to allow the belt to run across the field of the cultivation floor, because this makes it convenient to move plant containers from the floor to the transport belt.

The top layer of the field of the cultivation floor is often provided with a water-permeable cloth, which might become damaged if a moving belt were to scrape over it. The belt guide is provided for this purpose, for example between the top cloth of the field and the belt, in order to protect the top cloth of the field against the scraping action of the band sections moving back and forth. On the other hand, for example in the case of a cultivation floor made of concrete, asphalt, or another hard material, the belt itself might become damaged during use, which is then prevented by the belt guide.

For example, the invention provides for use in combination with a cultivation floor system with a cultivation floor on which plant containers are placed, which cultivation floor system comprises an ebb and flood water installation which is adapted to produce an alternating supply of water to the cultivation floor and drainage of water from the cultivation floor. For example, there is provided a water-tight basin with one or more irrigation lines in the basin which create several outlet openings along their length, making it possible for the water to flow out from the one or more irrigation lines. A water-permeable structure is then provided in the basin, where the lines are arranged in or beneath it. The structure has a permeable and horizontal top, possibly with a top cloth, which forms the cultivation floor on which plant containers are placed. Such a structure may contain one or more layers of granular material.

The use of a belt makes it possible for the plant containers to be transported relatively quickly. Preferably, the plant containers in the form of separate pots stand one behind another on a relatively narrow belt, so that the belt width can remain small, for example between 4 and 15 centimetres. In situations where a cultivation with trays is taking place, or where pots are first placed in trays and then the trays are transported with the belt, the belt can be adapted to the dimension of the trays, for example it can be 30-50 centimetres in width.

It is conceivable to use another transport belt in combination with a belt conveyor system according to the invention, which further transport belt links on to the belt of the belt conveyor system according to the invention in proximity of a mobile unit, and which further transport belt for example transports the harvested plant containers from one location next to the field of the cultivation floor to a central location, such as in a way already known in the industry, or with a second belt conveyor according to the invention, which runs along a field of the cultivation floor, for example transversely or perpendicular to the belt of the belt conveyor system which is arranged in the field of the cultivation floor. The transfer of plant container between the belt and another conveyor may be automated, if desired. During the harvesting, the other conveyor, such as the other belt, can transport the plant containers to a (temporary) processing room. The plant containers can also be placed automatically from the belt of the system according to the invention onto another belt or conveyor which transports the plant containers to such a (temporary) processing room.

The belt conveyor systems according to the invention can be used, for example, to remove plant containers, that is, to transport plant containers from a field of a cultivation floor to a location next to the cultivation floor. During the removal, the belt conveyor system will be set up so that the plant containers are placed on the returning belt section. Alternatively or at the same time, the belt conveyor systems according to the invention may also be used to place plant containers on the field of the cultivation floor. In that case, the plant containers in one embodiment will be placed on the forward running belt section, whereby they are transported from a location next to or outside of the field to the field of the cultivation floor.

A further benefit of the belt conveyors according to the invention is the possibility of providing a large and variable reach of the belt. As the stowing capacity of the buffer and the length of the belt increase, a longer transport belt can be arranged in the field of the cultivation floor.

In a practical implementation of one embodiment, the reach of the transport belt is, for example, more than 20 metres, for example more than 50 metres, such as more than 60 metres. The person skilled in the art will understand that for such a reach, with a forward running and a returning belt section, at minimum twice as much belt length is required. For a reach of 20 metres, therefore, a minimum of 40 metres of belt are required, for a reach of 50 metres a minimum of 100 metres of belt are needed, and for a reach of 60 metres a minimum of 120 metres of belt will be needed. It will be clear that a grower will set up the system each time at the desired place in relation to the field of the cultivation floor being tended and bring out the belt to the desired length so that, for example, workers who are bringing plant containers to the belt by hand have to walk the least possible distance.

In one embodiment of the system it is not so much the mutual spacing between the first and second mobile unit which is important to the length of the belt, but rather the desired transport capacity. After all, if the belt is being used for transport in the direction of the second mobile unit, for example, the belt at a given moment will run out and the buffer of the second mobile unit will become full. If that situation occurs when further transport of plant containers in that direction is still desired, an embodiment of this version of the invention proposes first carrying out a rewinding routine. In this process, the transport of plant containers is temporarily interrupted, the belt drive unit of the second mobile unit is halted, and the (rewind) drive unit of the first mobile unit is placed in operation just until the belt is rewound to the buffer of the first mobile unit and room is again created in the buffer of the second mobile unit. When the belt is entirely or partially rewound, the transport of plant containers by the belt can again commence by placing the drive unit of the second mobile unit in operation again.

In order to avoid frequent rewinding in one embodiment, it may be provided that a system is provided with more than 500 metres of belt, for example between 750 metres and 1500 metres, such as 1000 metres of belt. Then the buffers of the mobile units will also be adapted to buffer such a long belt length.

The rewinding occurs preferably at a much higher speed than the speed of the belt during transport of plant containers in order to thus limit the duration of the rewinding. For this purpose, the belt drive unit of at least one of the mobile units of this system is preferably provided with a drive unit for the belt which can realize a rewind speed which is higher than the transport speed of the belt during transport of plant containers. Preferably, the rewind speed is considerably higher, for example at least twice as high, as the transport speed. For example, the rewind speed is greater than 5 kilometres per hour, so that a belt of 1 kilometre can be rewound in 12 minutes or less.

As an alternative to the mentioned rewinding of the belt of the buffer from one mobile unit to the buffer of the other mobile unit, it may also be provided that the mobile unit switches location. Thus, the mobile unit with the full buffer is moved to the location of the other mobile unit with the empty buffer and vice versa. Then by extending the belt from the full buffer and connecting it to the empty buffer of the other mobile unit, the transport of plant containers may be continued once more in the same direction. For example, it may be provided that the mobile units are provided with wheels or the like, which travel across the temporary guide to change their location.

In general, it may be provided in the context of the present invention that one or more mobile units are adapted to travel over the temporary guide in order to bring the mobile unit to the desired location.

A further benefit of the belt conveyor systems according to the invention is that in a suitable embodiment each of its mobile units, but preferably also the reversal device if present, is adapted in any case to be movable as a whole from a stowing position to the cultivation floor. In the stowing position, the belt conveyor system is preferably protected against deleterious environmental factors, such as moisture, salts from irrigation water, water, etc., and in this stowing position there will then preferably occur little wear and tear on the belt conveyor system. When the growing plants are ready for harvesting, or are transported to another field (for example, in another greenhouse), the belt conveyor system can be taken out of storage and placed in use, and after use the belt conveyor system can be placed back in its stowing condition and stowed at the stowing location. The belt conveyor system likewise affords the possibility of being used on different, separate harvest fields, unlike a fixed, permanent layout.

The systems according to the invention may be used either in a greenhouse or outdoors. When used outdoors, and thus in wind and weather, a benefit of the systems is that the transport occurs, in a suitable low design of the belt guide, such as in the form of slide plates, close to the cultivation floor, so that the plant containers standing on the belt are as it were protected by the other plant containers still standing on the cultivation floor against the wind. For this reason, when wind conditions are unfavourable, it is thus possible to place the belt guide deliberately in the lee of other plant containers on the cultivation floor so as to prevent the wind from blowing over the plant containers standing on the belt.

As mentioned, the belt conveyor system comprises one or two mobile units, each of which is provided with a buffer and a drive unit in order to place the belt in operation. By mobile is meant in the context of the present patent application that the mobile unit can be moved conveniently. For this purpose, the mobile unit may contain wheels, for example, so that the unit can be driven for example through a greenhouse, such as along paths of the greenhouse. These wheels are then preferably provided with a locking device, so that the unit stands stable when the belt conveyor system is placed in operation. Alternatively, a mobile unit may also be moved with a forklift truck, for example.

In a possible embodiment of the invention, the belt guide forms a smooth slide surface, such that the belt or a section of the belt slides across the belt guide. The belt guide may be produced, for example, as a metal and/or plastic profile shape, with a smooth surface on the side across which the belt runs. The creation of a smooth surface ensures relatively little friction between the belt and the belt guide, and thus relatively little wear and tear. One factor at play here is that plant containers generally have a relatively low weight, so that the plant containers placed on the belt do not press very much on that slide surface. It is also possible to provide a water lubrication for a belt guide designed as a slide surface.

In a possible embodiment of the invention, the belt guide comprises slide plates to be laid on the cultivation floor, which slide plates, in use, are laid in a row, possibly against each other, in their longitudinal direction. There may be a mutual coupling of the plates, for example in order to prevent a shifting.

The slide plates may be oblong, for example, to be lifted by a single person, for example.

For example, the plates are made of a metal (such as aluminium or steel, for example galvanized steel) and/or a plastic. In the event that the plates are metal, they should generally be relatively rigid.

The plates may be moved for example with a cart, after which they are laid in a row in their longitudinal direction. The plates may then be laid against each other, so that an uninterrupted belt guide is formed, possibly with coupling members, but it is also conceivable for there to be a (small) spacing between two successive plates.

Preferably the belt guide is adapted to be low, i.e., with slight height, so that preferably the section of the belt on which the plant containers will stand is not more than 10 centimetres above the cultivation floor, preferably not more than 5 centimetres, in a practically advantageous embodiment not more than 3 or even, for a single row of slide plates, not more than 1.5 centimetres. This can easily be realized with slide plates, even with the double-decker design described herein, and it can for example prevent wind from taking hold of the transported plant containers, etc.

Alternatively with respect to, or in combination with, separate slide plates or the like, the belt guide may for example comprise a roll-up plastic strip, for example, which is relatively flexible and adapted to be rolled up, for example as a reel, with a section of the belt sliding over the roll-up plastic strip.

In a possible embodiment of the invention, the belt guide is gutter shaped, looking in a transverse cross section, wherein at least one section of the endless belt in the operating condition lies between upward pointing legs of the gutter shape of the belt guide. The forward running belt section or the returning belt section, or the single belt section in the version of claim 2, may for example be supported by a gutter section of the gutter-shaped belt guide, wherein the upward pointing legs of the gutter shape make it relatively difficult to move this belt with respect to the gutter shape in a transverse direction and scrape along the top layer of the cultivation floor. Preferably, the upward pointing legs are high enough to enclose both the forward running and the returning belt section, or the single belt section.

In a possible embodiment of the invention, the forward running and the returning belt sections lie horizontally and directly above each other, in the operating condition.

For example, directly on top of one another, wherein only the lower belt section runs across the belt guide. In an advantageous embodiment, the belt guide forms a slide surface in this case.

The forward running and the returning belt sections lying directly on top of each another with both belt sections running substantially horizontally makes the belt conveyor system relatively simple. No provisions are needed to separate the forward running and returning belt sections from one another. In an embodiment with a single row of slide plates as the belt guide, an anticipated drawback to this kind of embodiment is that the belt will become worn on account of the scraping action of the belt guide with respect to the lower belt section, and because of the mutual scraping action of the upper and lower belt sections. However, the belt conveyor system will generally not be in continuous operation, so that wear and tear on the belt occurs rather slowly. Also, the transport speed of the plant containers, and thus the speed of the belts, will generally be relatively low (less than 10 m/s), so that wearing will be relatively limited. In addition, the weight of the plant containers being transported will generally be relatively low, so that wearing is further limited.

It is conceivable that the belt is relatively cheap and, for example, it is made from belt material which is used for car seat belts. In this way, the belt is relatively cheap as compared to the benefits to be gained with the belt conveyor system according to the invention, including increased effective use of the floor surface of the cultivation floor. Any replacing of the endless belt with some regularity may be cost-efficient as compared to a permanently installed transport system.

In an embodiment wherein, in the operating condition, the forward running and the returning belt sections lie horizontally and directly on top of each other, and wherein only the lower belt section runs across the belt guide, the upper belt section is thus not separately supported by the belt guide.

Possible alternatives in which the forward running and the returning belt sections are separated with respect to each other by the belt guide may be implemented, for example, by orienting vertically the forward running or the returning belt section not used for the transport, and by orienting horizontally the other of the forward running or returning belt section, both belt sections possibly being arranged mutually at a distance from each other. In this case, the one belt section will then run for example along a single row of slide plates lying on the cultivation floor.

Another possibility of separating the forward running and the returning belt sections from each other is to provide a physical separation between the belt sections, for example by the use of rollers or other separations, movable or not.

In an exemplary embodiment, this physical separation is realized by making a belt guide with a lower row of slide plates to be laid on the cultivation floor, where in use the lower belt section slides across them. Moreover, there is provided an upper row of slide plates, to be laid on top of the lower row of slide plates, where the upper belt section slides across them. Such a double-decker slide plate assembly can be easily realized with a low height above the cultivation floor.

It is preferably possible to have the belt run in two directions, so that for example in the above described embodiment with the forward running and the returning belt sections arranged horizontally and directly on top of each other the upper belt section is adapted to run both forward and back. This makes it possible to both gather and set down plant containers with the belt conveyor system according to the invention.

Belt materials which can be used are for example a woven belt of plastic, such as polyester, nylon, or polypropylene, or a blend of one or more such materials. One possible specific belt which can be used for transport of plant containers is an automotive seat belt.

The belt is preferably suitable for several sizes of plant containers, and it may be for example at least 4 centimetres and at most 50 centimetres in width. In some embodiments, the belt may be narrower than the diameter of the plant container, and in other embodiments broader than the plant container. For trays, the belt may be 30-50 cm in width, for example.

In a possible embodiment of the invention, moreover, a pull out device is provided, which pull out device is preferably integrated with the reversal device. The pull out device is adapted to pull out the endless belt with regard to the mobile unit in which the belt is buffered in the stowing condition.

This pull out device for example comprises a driven cart, which cart for example can travel across the belt guide that is temporarily arranged on the field of the cultivation floor. The arrangement of a temporary belt guide across which the pull out device is adapted to be movable protects the top layer of the cultivation floor not only against the scraping action of the belt, but also against the friction caused by the travel of the pull out device or it provides just enough adhesion for the travelling cart. The extending of the belt and the placing of the belt conveyor system in operation may then take place fully automatically, for example, as soon as the mobile unit is placed next to the field of the cultivation floor. The pull out device could also contain a winch with a cable, such as an electrically operated winch mounted on the cart or, in one embodiment, on the other mobile unit, optionally on each mobile unit.

As a possible alternative, the belt may be adapted to be pulled out by hand, for example.

In a possible embodiment of the invention, the width of the belt guide is at least equal to the width of the belt. For example, the width of a gutter-shaped slide plate, measured between upward pointing legs of the slide plate, is at least equal to the width of the belt. For example, the width is at least 4 centimetres and at most 50 centimetres, for example between 4 and 15 centimetres, such as between 5 and 8 centimetres, for example made from belting for seat belts in cars.

For example, the total width of the belt guide is at least equal to the distance between wheels of the pull out device, measured in the width direction of the belt guide. The top layer of the floor is then preferably completely separated from moving components of the belt conveyor system in use, so that the top layer of the cultivation floor experiences no deleterious effects from the use of the belt conveyor system according to the invention.

In a possible embodiment of the invention, the pull out device is a cart, and wheels or the like of the cart travel during the extending of the belt on the outside of the upward pointing legs of the gutter-shaped belt guide. This has the benefit that, during the pulling out of the belt, the cart remains aligned with the belt guide. Preferably, in this embodiment, the cart arranges a forward running and/or returning section of the belt between the upward pointing legs of the gutter shape during the extending of the endless belt.

In a possible embodiment of the invention, the cultivation floor is provided with a water-permeable and horizontal top layer, the top layer containing a top cloth, which top cloth is formed for plant containers to be set thereupon, the cultivation floor preferably containing one or more layers of granular material. As an example, the cultivation floors of NL2010290, NL2010291, and NL2012248 are named for example.

Various embodiments of a buffer for the belt may be provided in the belt conveyor systems, for example a buffer in which the belt is stowed and from which the belt can be pulled out, and which makes use of mutually movable pulleys, yet the use of other kinds of buffers is also conceivable, such as buffers which make use of a spool.

In a possible embodiment of the invention, a buffer comprises several pulleys, placed at a distance from each other, wherein the endless belt is arranged across the pulleys. The pulleys may then preferably move toward and/or away from each other in order to make it possible to pull out and stow the transport belt, in the operating condition and the stowing condition of the belt conveyor system, respectively. In one version, it is also practically feasible to provide the buffers with a spool on which the belt is wound up.

In a possible embodiment of the invention, the buffer comprises at least two rows of pulleys, wherein the belt runs each time from a pulley of one row of pulleys in the direction of a pulley of the other row, the rows of pulleys in the stowing condition of the system being arranged mutually at a distance from each other, so that the belt is stowed in a space defined by the rows of pulleys arranged at a spacing from each other, and wherein the pulleys of the respective rows of pulleys are movable mutually toward and/or away from each other, in order to make possible the extending of the belt with respect to the buffer. The rows may then move toward each other as a whole when the belt is pulled out, or individual pulleys can move toward each other one by one whenever the belt is pulled out. Intermediate forms with other stepwise or continuously running belt paying out or taking in mechanisms are also feasible.

The rows of pulleys may be oriented vertically, for example, so that the stowed belt length is as it were stowed hanging in the space between the different rows of pulleys. However, the rows of pulleys may also be oriented horizontally or at some other angle with respect to the vertical, so that the belt for example is stowed more lying than hanging in the buffer.

The mobile unit may also be provided with a cleaning device for the belt, such as a scraper, a brush, and/or a water cleaner, so that the belt can be cleaned constantly or for example just before the buffering in the buffer.

The invention furthermore relates to a method for the transporting of plant containers on a cultivation floor making use of a belt conveyor system according to the invention.

The invention furthermore relates to a method for the collecting/removal of plant containers from a cultivation floor, as well as a method for placing plant containers on a cultivation floor. The two methods have much in common and only the method for collecting/removal of plant containers shall be described below in relatively greater detail. Similar steps are not described for the setting out of plant containers, only the different steps.

A method for the removal of plant containers from a field of a cultivation floor, wherein use is made of a belt conveyor system according to the present application, involves the steps of:

the placing of the mobile unit of the belt conveyor system, in its stowing condition, at a first location with respect to a field of the cultivation floor, such as next to the field of the cultivation floor, for example on a path, the arranging of the belt guide on the field of the cultivation floor, the extending of the endless belt, preferably across the previously arranged belt guide, the placing of the reversal device at a second location with respect to the field of the cultivation floor, for example on the cultivation floor or a path along the cultivation floor, at a distance from the mobile unit, optional: the arranging of the endless belt around the reversal member, the placing of the endless belt in operation, so that an endless belt is produced with a forward running belt section from the mobile unit to the reversal device and a returning belt section from the reversal device to the mobile unit, the picking up of plant containers from the cultivation floor and the placing of plant containers on the returning belt section, so that the plant containers are taken away from the cultivation floor.

It is not necessary for all steps to occur in the sequence described above. For example, it is possible to first place the belt guide on the field of the cultivation floor and only then to place the mobile unit next to the cultivation floor. It is also possible, for example, to arrange the reversal member around the endless belt before the reversal device is placed in the field or on a path along the field.

In use, a mobile unit of the belt conveyor system is driven for example along a path of a greenhouse, and it comes to stand on this path next to a field of the cultivation floor. The field of the cultivation floor will often run in a transverse direction with respect to the lengthwise direction of the path, such as perpendicular to it.

Before the endless belt is pulled out, the belt guide may first be arranged on the field of the cultivation floor. The belt guide, as described above, may contain slide plates, for example. It is conceivable that the belt guide is moved together with a mobile unit, for example on a cart, but this is not necessary. The belt guide may be moved on a separate cart, for example. The belt guide is preferably arranged in the lengthwise direction of the field, for example, transversely to the lengthwise direction of a path.

Generally the cultivation floor during the growing process of the plants will be completely full of plant containers. Therefore, before the belt guide can be arranged on the field of the cultivation floor, it may be necessary to first clear a track by displacing the pot holders, or to remove plant containers by hand from the cultivation floor through a first track, so that there is room on the cultivation floor for the belt guide.

Preferably the belt guide is first arranged before the belt is pulled out with respect to the buffer. However, it is also possible to first pull out the belt and only then to lay the belt guide on the field. In possible embodiments, the reach of the belt, measured in a lengthwise direction of the field, in its extended state is as large as the length of the field, but it is also possible for the reach of the belt to be greater or less than the length of the longest field.

In use of one system of the present application, during the removal of plant containers and plants, the plant containers are then picked up from the field of the cultivation floor and placed on the returning belt section, so that the plant containers are transported from the cultivation floor away from the cultivation floor.

In use of one system of the present application, for the setting out of plant containers on a cultivation floor, the method for use of the belt conveyor system is of course similar to the removal of plant containers, with the difference that the belt runs in a reverse direction with respect to its use during the removing of plant containers. In other words, when the upper of the two belt sections has the returning direction in the gathering process, in the setting out process for plant containers the upper belt section will have the forward running direction. During the placing of plant containers on a cultivation floor, the plant containers are placed from a position next to the field, near the mobile unit, on the forward running belt section, so that the plant containers are transported from a position next to the cultivation floor onto the cultivation floor.

In use of one system of the present application, the method may involve the steps of:

the placing of the first and second mobile units of the belt conveyor system, in its stowing condition, at respectively a first and second location with respect to the field of the cultivation floor, at a distance from each other, the arranging of the belt guide on the field of the cultivation floor in the section between the first and second location, the extending of the belt from the buffer of one mobile unit in which the belt was buffered in the stowing condition and the coupling of the extended belt to the drive unit and buffer of the other mobile unit, wherein during the extending the belt comes to lie on the preferably previously arranged belt guide, the placing of the belt drive unit of one of the mobile units in operation, so that the belt moves to that mobile unit and is buffered in the buffer of that mobile unit, the placing of plant containers on the belt, such that the plant containers are transported by the moving belt, if the buffer of the mobile unit placed in operation gets full before the intended transport of plant containers in the direction toward that mobile unit is completed, the interrupting of the placing of plant containers on the belt, the halting of the drive unit of the mobile unit whose buffer has become full, and the placing of the drive unit of the other mobile unit in operation, such that the belt is rewound to the buffer of the other mobile unit, and then the halting of the rewinding and the placing in operation once more of the drive unit of the mobile unit whose buffer has been fully unwound.

It is possible for both the first and the second mobile unit to be placed on a path, each at one end of the cultivation field.

It will be clear that it is beneficial when the rewinding occurs with a greater speed than that during the transport of the plant containers, for example at least twice as fast, for example at least at 5 km/h.

The belt length may be quite sizeable, for example longer than 500 metres, for example between 750 and 1500 metres, such as 1000 metres or so. The buffers should be adapted to that length.

A belt may be constructed from pieces coupled together in series, so that the length of the belt can be adapted to the situation, worn or damaged pieces can be replaced, etc.

In one embodiment, the belt is possibly composed of a first belt section which is buffered in the buffer of the first mobile unit in the stowing condition and of a second belt section which is buffered in the buffer of the second mobile unit in the stowing condition, and a coupling arrangement to couple the belt sections. In this case, the second belt section may be a short section, in fact so short that the length of the belt is mainly formed by the first section. But it is also conceivable for the first and second belt section to be equally long or at least for each to form more than 30% of the total belt length. This may ensure, for example, that the weight of a mobile unit remains limited for its movement between a stowing location and the operating location at the cultivation floor.

The invention also relates to a cultivation floor in combination with a belt conveyor system as described herein. For example, wherein the cultivation floor is provided with a water-permeable and horizontal top layer, such as when the top layer comprises a top cloth, which top cloth is adapted for placement of plant containers on it. In possible embodiments, the cultivation floor comprises one or more layers of granular material, such as lava rock, beneath the top cloth.

The invention also relates to a mobile unit as described herein and to its use in a belt conveyor system as described herein.

The invention also relates to the growing of plants on a cultivation floor, such as ornamental plants or other crops (suitable for human consumption), such as strawberries in trays, where use is made of a belt conveyor system as described herein. The system is installed at a field and used whenever plant containers need to be removed from or brought to the field, and the growing of the plants occurs when the plant containers are standing on the field of the cultivation floor.

Preferably the system, or at least its mobile unit or units, is stowed when not in use at a stowing location, preferably in a shielded room, for example safeguarded from the climate in the growing section of a greenhouse.

A second aspect of the invention relates to a belt conveyor system for the transporting of plant containers over a cultivation floor for the removal of plant containers from a field of the cultivation floor and/or for the supplying of plant containers to be set up on a field of the cultivation floor, wherein the belt conveyor system comprises:

an endless belt on which plant containers are adapted to be placed;

a drive unit to place the endless belt in operation, a belt guide which is adapted to be placed, preferably temporarily, on the field of the cultivation floor, wherein the belt guide comprises a row of slide plates to be laid on the cultivation floor, which slide plates, in use, are laid in a row, possibly against each other, in their longitudinal direction. The slide plates may have one or more characteristics as explained herein.

In an embodiment it is provided that the belt guide comprises a lower row of slide plates to be laid on the cultivation floor, where—in use—the lower belt section slides across them, and an upper row of slide plates, to be laid on the lower row of slide plates, where—in use—the upper belt section slides across them. This double-decker design makes it possible, for example, to avoid friction between the upper and lower belt sections.

In an embodiment, a row of slide plates, possibly the lower and the upper row of slide plates, is provided with a gutter-shaped cross section, where at least one section of the belt, in the operating condition, lies between upward pointing legs of the gutter shape of the slide plates of the belt guide.

In an embodiment, the lower row of slide plates and the upper row of slide plates are adapted to be vertically nesting, so that the upper row of slide plates engages with the lower row of slide plates, for example wherein the legs of the gutter shape of the lower row of slide plates and those of the upper row of slide plates are adapted to be vertically nesting, leaving open a space between the stacked slide plates for the lower belt section. For example, the legs have an inverted V shape in cross section.

In an embodiment, the belt conveyor system is furthermore provided with a pull out device, which pull out device may be integrated with a reversal device for the belt, wherein the pull out device is adapted to pull out the belt with regard to a mobile unit in which it is buffered in the stowing condition, for example it comprises a driven cart, which cart for example is adapted to travel across the temporary belt guide that is temporarily arranged on the field of the cultivation floor.

The invention also relates to the combination of a cultivation floor and a system according to the second aspect of the invention, and to the growing of plants on a cultivation floor, wherein use is made of the system according to the second aspect of the invention for the supplying and/or removal of plant containers.

BRIEF DESCRIPTION OF THE DRAWINGS

The invention shall be explained more closely in the following description with the help of the drawings, in which:

FIG. 6 shows schematically a variant of the system according to the invention.

FIG. 1 shows schematically a cultivation floor 2 with two fields 2A, 2B and along the fields 2A, 2B a path 2C. This cultivation floor 2 can be used, for example, to grow plants, for example in plant containers 3. The cultivation floor 2 for example can be used in horticulture, as in a greenhouse. During the growth phase of the plants, the entire field 2A, 2B will generally be filled with plant containers 3, although this is not shown in FIG. 1. The cultivation floor 2 shown in FIG. 1 is a simplified representation of the practically used cultivation floors 2, on which far more fields 2A, 2B can generally be distinguished, for example on the other side of the path 2C. In FIG. 1, there is arranged on the right field 2A a belt conveyor system 1 according to the invention. To make this possible, a row of plant containers 3 can be at first shoved to the side, so that an open space is created on the field 2A of the cultivation floor 2, on which the belt guide 9 is placed. Alternatively, this row of plant containers 3 shoved to the side may be removed by hand directly from the field 2A.

For example, it is possible to grow different plants on the fields 2A, 2B of the cultivation floor 2. Thus, for example, it is possible to place another variety of plant on the fields 2A, 2B, or for the size and/or lifetime of the plants on the fields 2A, 2B to be different. It is possible, for example, for the growth conditions to differ between fields 2A and 2B, for example by arranging an ebb and flood separation between the fields 2A, 2B.

Figure 1:
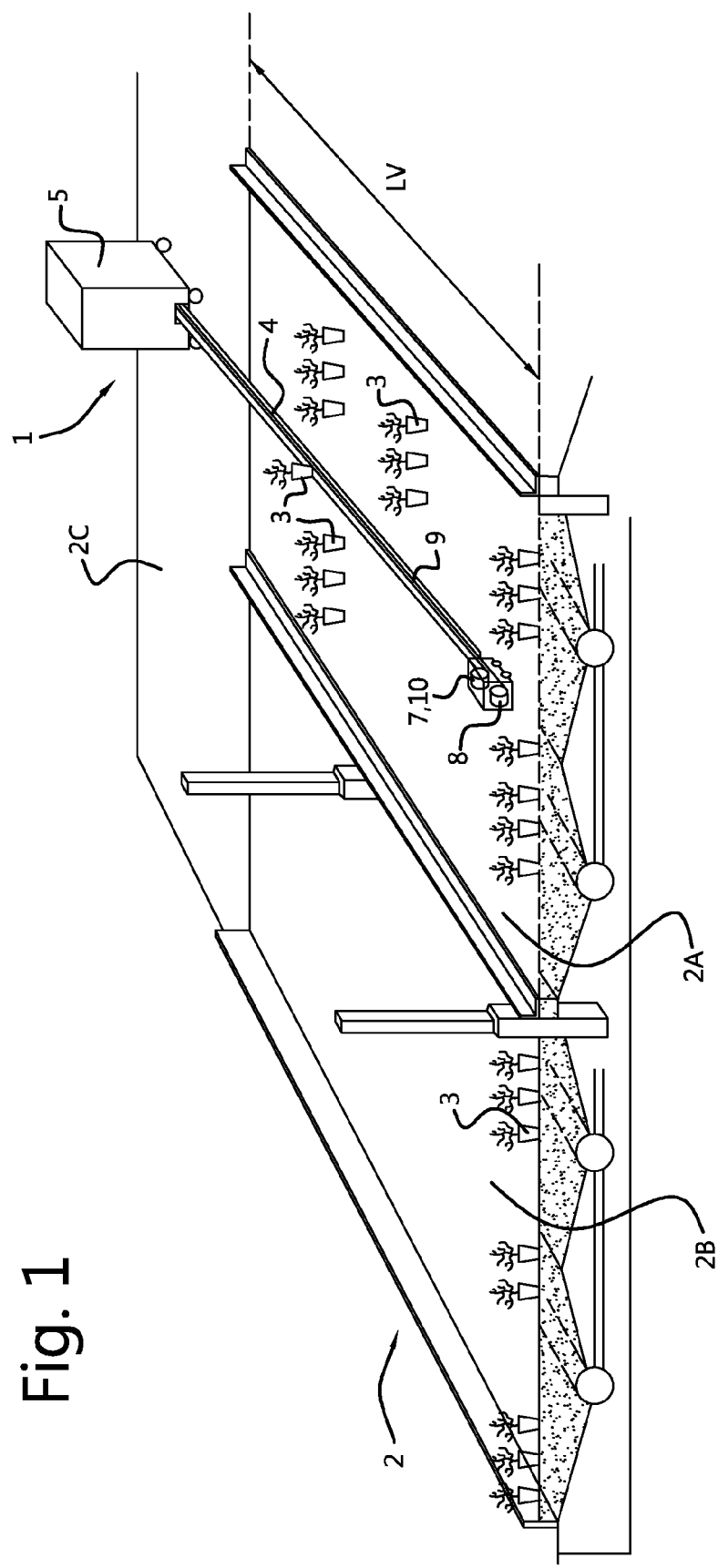
FIG. 1 shows a schematic top view in perspective of a cultivation floor, with plant containers and the belt conveyor system on it.

The mobile unit 5 of the belt conveyor system 1 is placed next to the field 2A, in the case of FIG. 1 on a path 2C. It is alternatively conceivable for no paths 2C to be present in the greenhouse, or along the fields 2A, 2B of the cultivation floor 2, and for the belt conveyor system 1 to be placed elsewhere next to the field 2A of the cultivation floor 2. The belt conveyor system 1 according to the invention comprises a mobile unit 5, an endless belt 4, a reversal device 7, and a temporarily arranged belt guide 9. The mobile unit 5 of the belt conveyor system 1 is provided with a buffer (not visible) which is adapted to buffer the endless belt 4, in a stowing condition of the belt conveyor system 1. The mobile unit 5 further comprises a drive unit (not visible) for placing the endless belt 4 in operation, in the operating condition of the belt conveyor system 1. The belt conveyor system 1 furthermore comprises an endless belt 4, on which plant containers 3 are adapted to be placed.

The reversal device 7 of the belt conveyor system 1 is provided with a reversal member 8, which reversal device 7 is adapted to be placed on the field 2A, 2B of the cultivation floor 2, at a distance from the mobile unit 5. This is shown in FIG. 1, where the reversal device 7 runs into the field 2A as compared to the mobile unit 5 which is placed on the path 2C.

The belt guide 9 of the belt conveyor system 1 is arranged beneath the belt 4 in the perspective top view of FIG. 1. The belt guide 9 is placed between the mobile unit 5 and the reversal member 8, on the field 2A, 2B of the cultivation floor 2.

FIG. 1 shows the belt conveyor system 1 in an operating condition, in which the belt conveyor system 1 is able to transport plant containers 3 over a cultivation floor 2, or a field 2A, 2B thereof. In this operating condition, the endless belt 4 is pulled out with respect to the mobile unit 5 and the endless belt 4 lies around the reversal member 8 of the reversal device 7, placed on the field at a distance from the mobile unit 5, so that an endless belt 4 is created with a forward running belt section from the mobile unit 5 to the reversal device 7 and a returning belt section from the reversal device 7 to the mobile unit 5, wherein the reversal device 7 turns the endless belt 4, and the endless belt 4 runs between the mobile unit 5 and the reversal device 7 over the belt guide 9.

The reversal device 7 may be provided with a belt drive unit, such as a driven roller which drives the belt.

The reversal device 7 may be set up for example on a path along the field, such as a concrete path, and/or be anchored temporarily there.

The reversal device 7 may be suspended in movable manner from a pipe or pipes running above the field, for example in a greenhouse.

Besides this operating condition, a stowing condition can be defined for the belt conveyor system 1 of the invention. In this stowing condition, the endless belt 4 is buffered in the buffer of the mobile unit 5, and the mobile unit 5 is usually stowed at a location away from the cultivation floor 2.

In the specific embodiment of FIG. 1, in the operating condition shown, the forward running and the returning belt sections lie directly above each other and both belt sections are oriented horizontally, only the lower belt section running across the belt guide 9.

In the specific embodiment of FIG. 1, the belt conveyor system 1 may be used for example to remove plant containers 3 from the field 2A. In that case, the upper belt section will preferably have the returning direction. It is preferable that the direction of turning of the belt can also be reversed, so that the upper belt section, in the specific embodiment of FIG. 1, has the returning direction. In that case, the belt conveyor system 1 according to the invention can be used, for example, to supply plant containers 3 for placement on a field 2A, 2B of the cultivation floor 2, for example, from the path 2C.

The field 2A, 2B of the cultivation floor 2, of which a top view is visible in perspective in FIG. 1, is provided in an advantageous embodiment with a water-permeable and horizontal top layer, the top layer comprising a top cloth 2D, which top cloth 2D is formed to have plant containers 3 placed thereon, the cultivation floor preferably containing one or more layers of granular material.

Figure 2:
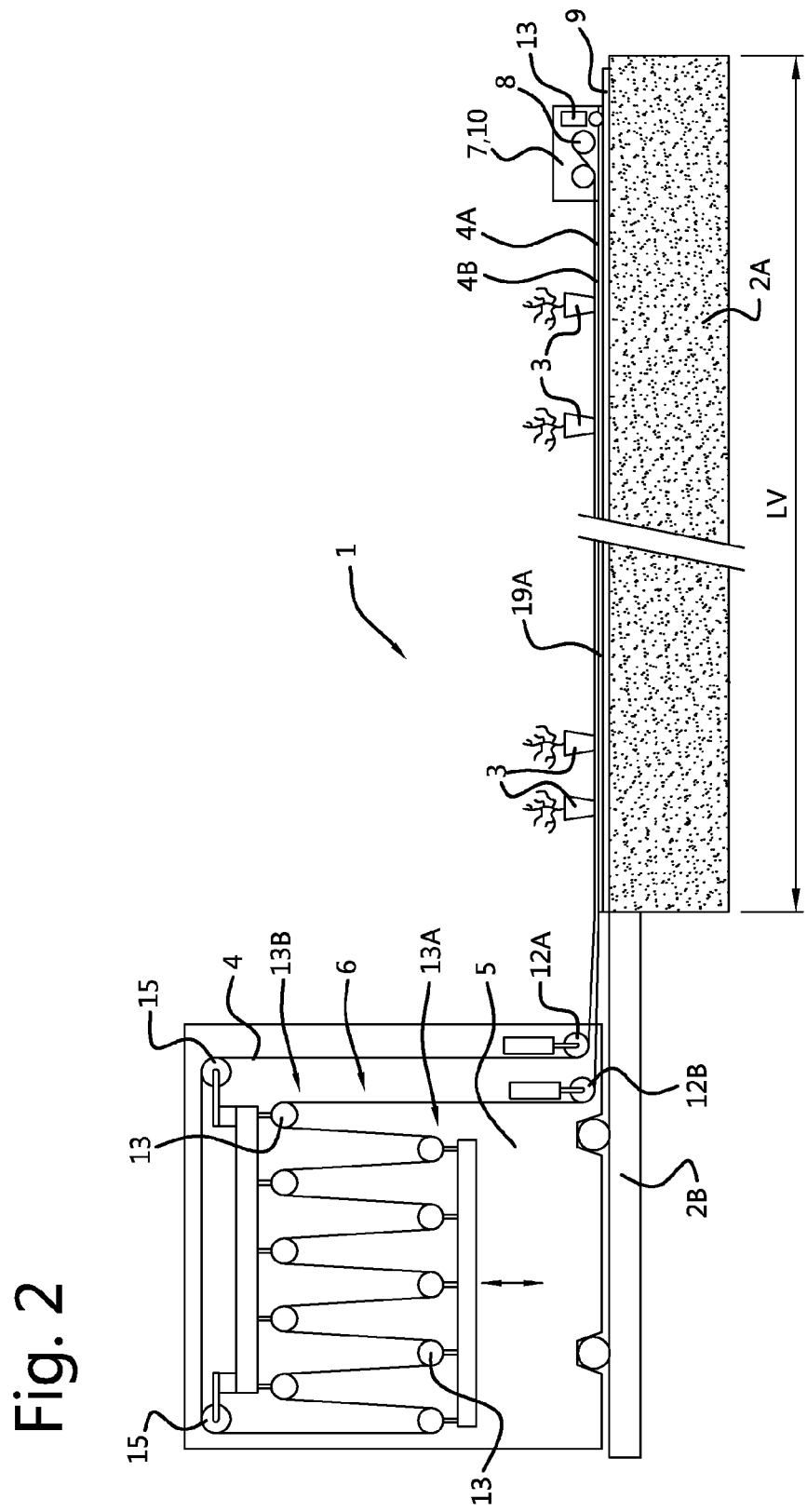
FIG. 2 shows a schematic side view of the cultivation floor, with a belt conveyor system on it in the operating condition.

FIG. 2 shows a side view of the belt conveyor system 1, in which the belt conveyor system 1 is in an operating condition. The mobile unit 5 of the belt conveyor system 1 is placed next to a field 2A of the cultivation floor 2, and the endless belt 4 is pulled out in a lengthwise direction from and over the field 2A. The endless belt 4 is arranged around a reversal member 8, which reversal member 8 is pulled out together with the endless belt 4 by an pull out device 10.

In the embodiment of FIG. 2, the pull out device 10 and the reversal device 7 are integrated.

In the specific embodiment of FIG. 2, the pull out device 10 is a cart 11, which cart 11 is adapted to pull out the endless belt 4 relative to the mobile unit 5. More specifically, the cart 11 is driven in the embodiment of FIG. 2 and can travel across the temporary belt guide 9, which temporary belt guide 9 is arranged on the field 2A of the cultivation floor 2, and which belt guide 9 extends in a lengthwise direction from the field 2A with respect to the mobile unit 5, between the mobile unit 5 and the reversal device 7. The temporary belt guide 9 protects a top cloth 2D of the field 2A against the scraping action of the endless belt 4.

In the specific embodiment of FIG. 2, the buffer 6 of the mobile unit 5 is formed by a number of pulleys 13. These pulleys 13 are accommodated in two rows 13A, 13B, the two rows 13A, 13B being arranged at a distance from each other, and the rows 13A, 13B being able to move toward and away from each other. When the rows of pulleys 13A, 13B move toward each other, more of belt 4 can be pulled out from the buffer 6, and when the rows of pulleys 13A, 13B move away from each other, more of belt 4 will be stowed in the buffer 6. The endless belt 4 is arranged around the pulleys 13, wherein the endless belt 4 always runs from a pulley 13 of the upper 13B or lower 13A row of pulleys to a pulley 13 of the other of the upper 13B or lower 13A row of pulleys, so that the belt 4 is stowed in the space between the two rows of pulleys 13A, 13B.

Also visible in FIG. 2 are guides 15, in this specific case also in the form of pulleys. These guides lead the belt 4 into the mobile unit 5.

FIG. 2 shows the operating condition of a belt conveyor system 1 according to the invention. The endless belt 4 is entirely or partially pulled out, preferably as far as one end of the field 2A, looking from the mobile unit 5, and the reversal device 7 is placed near the end of the belt guide 9, looking from the mobile unit 5, on the field 2A of the cultivation floor 2. The belt 4, in the embodiment of FIG. 2, is placed in operation by the drive unit 12A or 12B, wherein the direction of turning of the endless belt 4 is such that the lower belt section 4B has the previously defined forward running direction, and the upper belt section 4A has the previously defined returning direction. On the upper belt section 4A there have been placed four plant containers 3, which plant containers 3 are being transported from the field 2A of the cultivation floor 2 to a position next to the cultivation floor 2.

Two different drive units 12A, 12B can be seen in FIG. 2. Since the transport belt is driven in traction, two different drive units 12A, 12B are required in order for the belt 4 to run in two different directions. The one drive unit 12A, 12B will make the upper belt move in a forward running direction, while the other drive unit 12A, 12B will make the upper belt move in a returning movement.

It is furthermore possible to provide more than two drive units 12A, 12B. For example, it is conceivable that the reversal member 8 is provided with a drive unit, for example through the drive unit 13 of the pull out device 10 in the specific embodiment of FIG. 2.

The length LV of the field 2A and the total required belt length of the endless transport belt 4 are related to each other, the total length of the belt 4 being preferably at least twice the length LV of the field 2A, 2B. Preferably, the total length of the endless belt 4 is longer than 40 metres, for example longer than 100 metres, such as longer than 120 metres. The belt 4 for example can have a maximum length of 250 metres. This makes it possible, for example, to use the belt conveyor system 1 in fields 2A, 2B with a length of at most 20 metres, or respectively at most 50 metres, or respectively at most 60 metres. Of course, it is possible to use a belt conveyor system 1 according to the invention with a belt length of 40 metres, for example, in a field 2A, 2B with a length LV of, for example, 30 metres, but then the use of the belt conveyor system 1 will be less efficient, since then the belt 4 can only be arranged over a portion of the total length LV of the field 2A, 2B. On the other hand, it is quite possible to use a belt conveyor system 1 according to the invention with a belt length of 120 metres on a field 2A, 2B which is shorter than 60 metres, such as 50 metres or 40 metres. This latter example is illustrated in FIG. 2, where there is still some belt 4 present in the buffer 6, which belt length could be used from the buffer in order to increase the reach of the belt conveyor system 1. Preferably, the total belt length is of such a length that the belt conveyor system 1 can be used on the longest field of the cultivation floor 2.

In FIG. 2 the belt guide 9 is formed by multiple slide plates 19A laid against each other on the cultivation floor. These slide plates 19A may for example be made of a relatively rigid material such as a metal, for example galvanized steel, which slide plates 19A, in use, are laid in a row in their lengthwise direction. The slide plates 19A can then be laid against each other, as shown in FIG. 2, but the slide plates 19A may also be laid at a distance from each other.

Alternatively, the belt guide 9 may be formed, for example, from a long, contiguous strip of material.

A benefit of the invention is that, once the plant containers 3 have been delivered to or removed from the field 2A of the cultivation floor, the belt conveyor system 1 can be placed in a stowing condition, and moved to a position in the field 2B situated nearby. The belt conveyor system 1 can then be placed once more in the operating condition and plant containers 3 can be delivered to or removed from this nearby field 2B of the cultivation floor.

The invention ensures that, for the delivery of plant containers to various fields and/or for the removal of plant containers from various fields, the system is always moved once more to the next field being worked. Thus, a grower only needs to have one or a couple of systems in order to meet his transport needs.

If no use is being made of the system, it is provided that the system is stowed, preferably in a shielded room. In this way, the system when not in use is not subjected to deleterious influences, such as rain, ebb/flood, moisture, etc. This holds in particular for the one or more mobile units of the system, which might be relatively vulnerable, for example due to the presence in them of one or more (electric) motors, a (computer) control system, etc., and preferably this also holds for the belt itself, for example in order to prevent weathering, algae growth, etc. The guide, for example adapted as a slide plate, can possibly be stowed in a non-shielded room, since this may be less vulnerable in design, for example made of metal or plastic plates, and it can optionally remain lying or stowed on an unused portion of the cultivation floor (if present).

Figure 3:
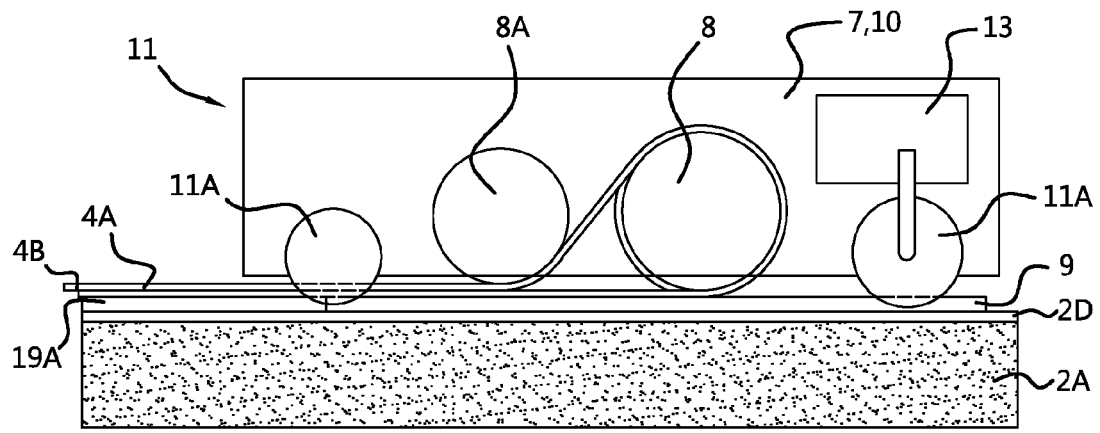
FIG. 3 shows schematically a detail of FIG. 2.

FIG. 3 shows the pull out device 10 in more detail than FIG. 2. In the embodiment of FIG. 3, the pull out device 10 and the reversal device 7 are integrated in a cart 11. This cart 11 can travel here over the belt guide 9, in this example with wheels 11A. The belt guide may be provided with one or more tracks for wheels of the reversal device, for example tracks with a rougher surface than the track over which the belt slides. For example, an upright barrier is present between such a travel track and the sliding track for the belt.

The cart 11, in the exemplary embodiment of FIG. 3, is driven by a motor 13, such as an electric motor. In FIG. 3, the motor 13 drives only the front wheel 11A or the front wheels 11A, but it is conceivable that the motor 13 moreover drives the rear wheel 11A or the rear wheels 11A as well. It is moreover conceivable that the motor also drives the reversal member 8 of the pull out device 7.

The reversal member 8 turns or reverses the belt 4. Preferably, a further member 8A is provided, which member 8A positions the upper belt 4A above the lower belt 4B. In the specific embodiment of FIG. 3, the lower belt 4B will have the forward running direction and the upper belt 4A the returning direction. In an embodiment not shown, this direction is reversed, so that the upper belt 4A has the forward running direction and the lower belt 4B the returning direction.

Figure 4A:
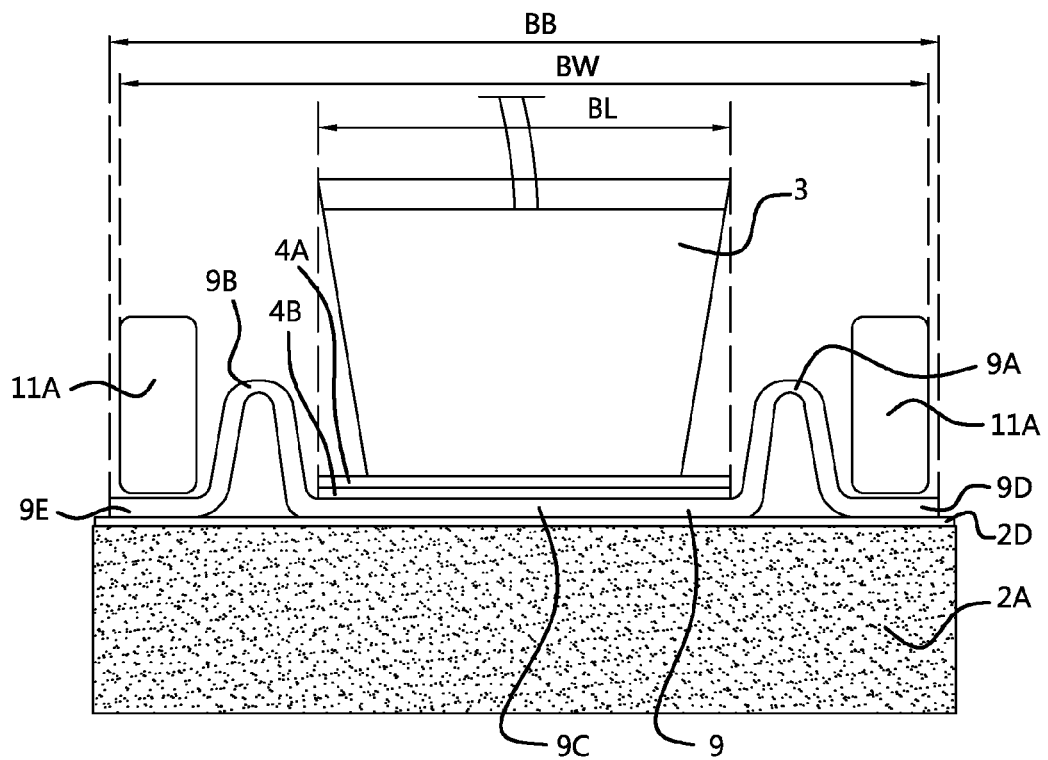
FIG. 4A shows schematically a cross section of a belt guide of the belt conveyor system according to the invention.

FIG. 4A shows a cross section of a temporary belt guide 9, for example a row of slide plates to be laid on the cultivation floor. This is only one possible example of how a cross section of a temporary belt guide 9 might appear, and many other cross sections are conceivable. The temporary belt guide 9 as shown in FIG. 4A is partly gutter-shaped, with a central gutter base 9C, upright legs 9A, 9B at outer ends of the gutter base 9C, and relatively flat guiding pieces 9D, 9E at the outer ends of these legs 9A, 9B.

FIG. 4A shows a cross section of the temporary belt guide 9, in which an pull out device 10 pulls out the endless belt 4 with respect to the buffer (not shown) of the mobile unit (not shown). In the specific embodiment of FIG. 2, the pull out device 10 is a cart 11.

The width BB of the belt guide 9, in the embodiment of FIG. 4A, is greater than a width BL of the belt 4.

The width BB of the belt guide 9 shown here is likewise greater than the distance BW between wheels 11A of the cart 11, measured in the width direction of the belt guide 9.

This makes it possible for wheels 11A of the cart 11 to travel on the outside of the upward pointing legs 9A, 9B of the gutter-shaped temporary belt guide 9 during the extending of the endless belt 4.

In a possible embodiment, a mobile unit of the system may be adapted to be driven across the belt guide 9.

The upper 4A and lower 4B section of the endless belt 4 in this case lie furthermore between the upward pointing legs 9A, 9B of the gutter-shaped temporary belt guide 9.

In absolute figures, the endless belt 4 may be, for example, at least 4 centimetres in width, and for example at most 15 centimetres in width.

The temporary belt guide 9 preferably forms a smooth slide surface, such that a section of the endless belt 4 slides over the temporary belt guide 9, without too much scraping or friction occurring between the temporary belt guide 9 and the endless belt 4.

Figure 4B:
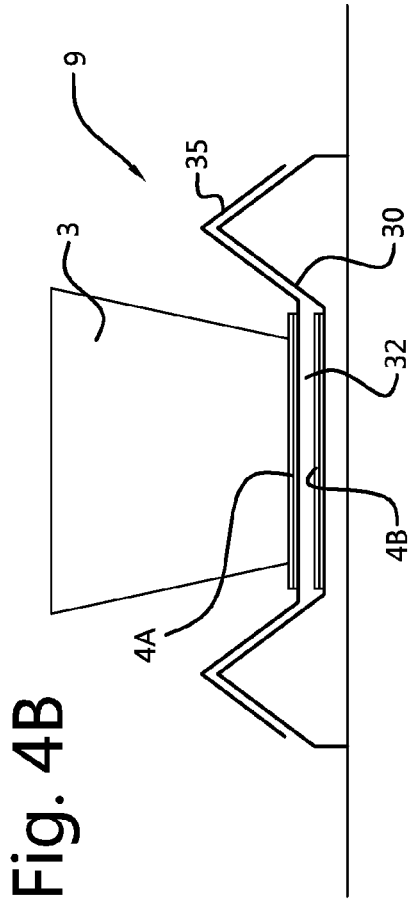
FIG. 4B shows schematically a cross section of an alternative belt guide of the belt conveyor system according to the invention.

FIG. 4B shows an alternative embodiment of a temporary belt guide 9. Here, there is provided a lower row of slide plates 30 to be laid on the cultivation floor, across which the lower belt section 4B slides during use. Moreover, there is provided an upper row of slide plates 35, to be laid on the lower row of slide plates 30, across which the upper belt section 4A slides. This provides, as it were, a double-decker assembly of slide plates.

It will be noticed in FIG. 4B that the lower row of slide plates 30 and the upper row of slide plates 35 are vertically nestable, so that the upper row of slide plates 35 stands in engagement with the lower row of slide plates 30. Preferably, the engaging prevents at least sideways displacement of the upper slide plates with respect to the lower slide plates. Preferably, the lower and upper rows of slide plates are adapted such that a substantially closed tunnel, with exception of the axial ends, is formed for the lower belt section 4B, for example in order to prevent dirt from getting into the tunnel.

For example, slide plates 30, 35 are placed in a row with their head or axial ends adjacent to each other.

In practice, it is conceivable that the lower row of slide plates 30 is first laid in a row on the cultivation floor, and then the belt is pulled out, and then the upper row of slide plates 35 is installed on the lower row of slide plates 30.

It can be seen that the legs of the gutter shape of the lower row of slide plates 30 and the legs of the upper row of slide plates 35 are vertically nestable, for example, inverted V-shaped legs in cross section, leaving open a space 32 between the stacked slide plates 30, 35 for the lower belt section 4B which slides across the lower slide plates 30 and runs free from the upper slide plates 35. The upper belt section 4A slides in this process across the upper slide plates 35.

The invention furthermore provides a method for the removal of plant containers 3 from a field 2A, 2B of a cultivation floor 2, wherein use is made of a belt conveyor system 1 as described herein, wherein the method involves the steps of:

the placing of the mobile unit 5 of the belt conveyor system 1, in its stowing condition, next to the field 2A, 2B of the cultivation floor 2, the arranging of the belt guide 9 on the field 2A, 2B of the cultivation floor 2, the extending of the endless belt 4, preferably across the previously arranged belt guide 9, the placing of the reversal device 7 on the field 2A, 2B of the cultivation floor 2 or on a path along the field, at a distance from the mobile unit 5, optional: the arranging of the endless belt 4 around the reversal member 8, the placing of the endless belt 4 in operation, so that an endless belt is produced with a forward running belt section from the mobile unit 5 to the reversal device 7 and a returning belt section from the reversal device 7 to the mobile unit 5, the picking up of plant containers 3 from the cultivation floor and the placing of plant containers 3 on the returning belt section, so that the plant containers 3 are taken away from the cultivation floor 2.

The invention furthermore provides a method for the placing of plant containers 3 on a field 2A, 2B of a cultivation floor 2, wherein use is made of a belt conveyor system 1 according to the present application, wherein the method involves the steps of:

the placing of the mobile unit 5 of the belt conveyor system 1, in its stowing condition, next to the field 2A, 2B of the cultivation floor 2, the arranging of the belt guide 9 on the field 2A, 2B of the cultivation floor 2, the extending of the endless belt 4, preferably across the previously arranged belt guide 9, the placing of the reversal device 7 on the field 2A, 2B of the cultivation floor 2, at a distance from the mobile unit 5, optional: the arranging of the endless belt 4 around the reversal member 8, the placing of the endless belt 4 in operation, so that an endless belt is produced with a forward running belt section from the mobile unit 5 to the reversal device 7 and a returning belt section from the reversal device 7 to the mobile unit 5, the placing of plant containers 3 on the forward running belt section so that the plant containers 3 are transported from a position next to the cultivation floor 2 to the cultivation floor 2.

It may also be provided that the belt is arranged more or less permanently around the reversal member of the reversal device.

For example, the mobile unit is provided with a docking station for the reversal device, so that this can be moved together with the mobile unit, preferably with the belt running about the reversal member.

For example, the mobile unit is provided with an operating panel for the control of a drive unit of the reversal device, being optionally wireless.

For example, the reversal device is provided with an electric drive unit in order to travel over the cultivation floor to the desired place and back again to the mobile unit.

The reversal device may be provided with a storage battery for the electric drive unit.

Figure 5:
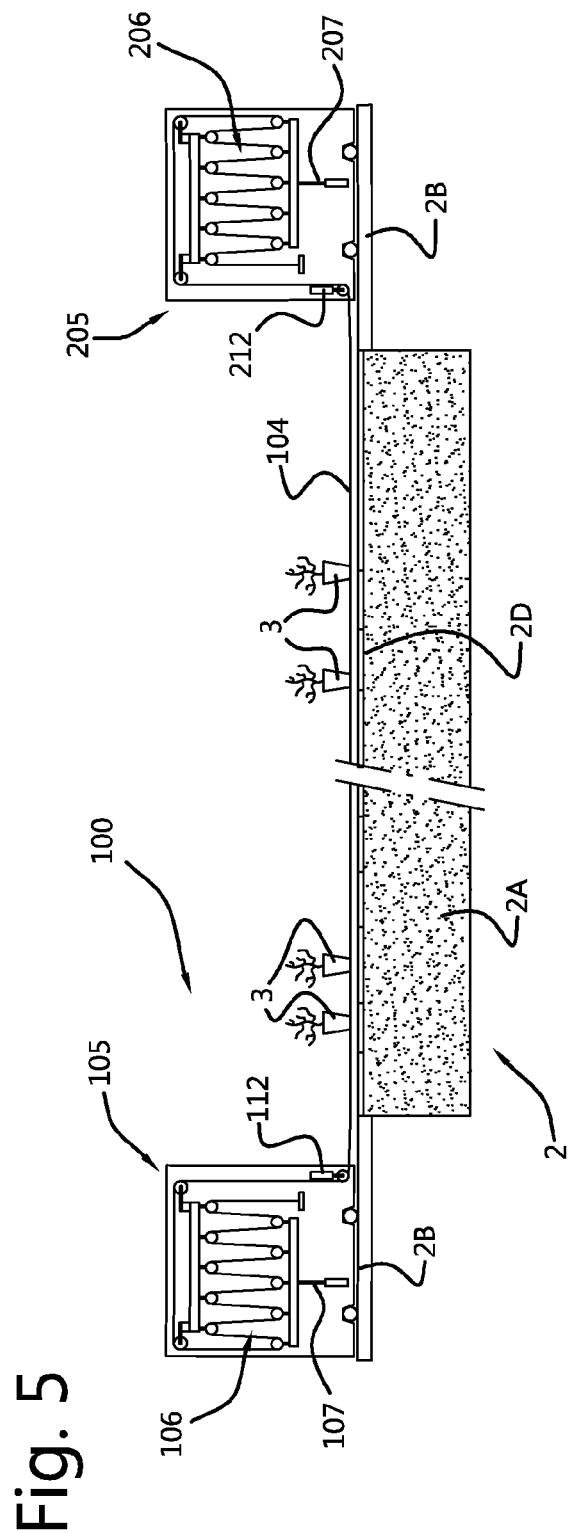
FIG. 5 shows schematically a side view of the cultivation floor, with a belt conveyor system on it in the operating condition.

With reference to FIG. 5, a system according to claim 2 shall now be explained. In FIG. 5, components which correspond to those in one of the other figures are provided with the same reference numbers.

Plant containers 3 stand on the cultivation floor 2, specifically on the portion provided with the top cloth 2D, during the growing. If the plants have grown enough, or for an intermediate handling, the plant containers are removed with the aid of the belt conveyor system 100 shown here schematically for the transporting of plant containers 3 across the cultivation floor 2.

The belt conveyor system 100 comprises a belt 104 on which plant containers 3 are adapted to be placed. For example, the belt 104 is more than 500 metres long.

A first mobile unit 105 can be seen, provided with a buffer 106, which is adapted to buffer the belt 104, and a drive unit 112 for placing the belt 4 in operation for the transport of plant containers 3. Moreover, there is provided a rewinding drive unit 107 in order to rewind the belt 104 at a high speed.

The first mobile unit 105 is placed here at a first location with respect to a field of the cultivation floor, here on the path 2B.

A second mobile unit 205 can be seen, provided with a buffer 206, which is adapted to buffer the belt 104, and a drive unit 212 for placing the belt 104 in operation for the transport of plant containers 3. Moreover, there is provided a rewinding drive unit 207 in order to rewind the belt 104 at a high speed. By providing both mobile units with a rewinding drive unit as well as a transport drive unit, as is preferable, it makes no difference on which side of the field each unit is placed. Preferably, the units 105, 205 are identical, so that a grower for example can have 5 units in order to use two systems at the same time and then also have one unit in reserve.

The second mobile unit 205 is placed at a second location with respect to a field of the cultivation floor, at a distance from the first mobile unit 105; here, on another path 2B at the other end of the portion of floor where the plant containers 3 are standing.

The temporarily arranged belt guide 9 can be seen, which is adapted to be placed between the first mobile unit 105 and the second mobile unit on the field of the cultivation floor 2.

In a beginning situation, the belt 104 is for example buffered in its entirety in the buffer 106 of the first mobile unit 105. Possibly a small piece of belt is then located in the second mobile unit 205, so that its buffer is not entirely empty and so that the drive unit 212 is in firm engagement with that piece of belt.

The belt 104 is then pulled out from the buffer 106, across the cultivation floor, preferably along the already laid down belt guide 9. The pulling out can be done by hand or with a cart, or with a winch (possibly provided on mobile unit 205).

The belt 104 is pulled out until it reaches the other mobile unit and can be operationally coupled to it. For example, coupled to the small piece of belt present therein.

In the initial operating condition, the belt is thus indeed pulled out, but most of the belt 104 still sits inside the buffer 106. Moreover, only one belt section is thus present on the guide 9, since there is no forward running and returning belt section in this version.

Now the plant containers, loose pots and/or trays can be placed on the belt 3. By placing the drive unit 212 in operation, the belt 104 with plant containers 3 is pulled in the direction of the path near mobile unit 205. Here, the plant containers 3 can be picked up from the belt 104, and possibly transferred automatically to another conveyor which runs along or over the path. During this removal process of plant containers, the buffer 206 gets increasingly more full with belt 104 and the other buffer 106 increasingly more empty.

At a certain time, for example when the buffer 206 is full, the removal of plant containers 2 may be temporarily interrupted for a rewinding routine. In this process, the belt is rewound from the buffer 206 to the buffer 106 of the other mobile unit. For this purpose, the rewinding drive unit 107 is used to rewind the belt 104 at a high speed. When the rewinding is properly finished, the transport process may be started again by placing plant containers 3 on the belt 104 and again starting the drive unit 212.

As an alternative for the rewinding of the belt from the buffer of the one mobile unit to the buffer of the other mobile unit as mentioned here, it may also be provided that the mobile units switch location. Thus, the mobile unit 205 with the full buffer 206 is moved to the location of the other mobile unit 105 with the empty buffer 106 and vice versa. By then pulling out the belt from the full buffer 206 and coupling it with the empty buffer 106 of the other mobile unit, the transport of plant containers 3 may be continued in the same direction. For example, it may be provided that the mobile units are provided with wheels or the like, which travel across the temporary guide in order to switch locations.

It is also conceivable that unit 205 with (partly) full buffer 206 travels from the path where unit 105 is stationed across the field to another path, for example, and in this process the belt is given up from the 206 and comes to lie or is placed on the belt guide 9. Then when the unit 205 has reached its destination, and perhaps been anchored there (for example on the path), the belt may be placed in motion. Possibly plant containers may continue to be put in place during the movement of the unit 205 to that position. This can be done, for example, with an entirely full buffer 206 and an empty buffer 106 in the beginning stage, after which the belt is moved in the direction of unit 205 for transport of the plant containers 3. The buffers in this case may be reels or spools.

The buffers 106, 206 may also be adapted simply as spools or reels, on which the belt 104 is wound and unwound. The belt drive unit may then drive the spool, for example by connecting a motor to the hub of the spool. A spool with a length of belt may be removable from the mobile unit, for example in order to install a spool with a different width of belt in the mobile unit.

FIG. 6 shows an embodiment in which mobile unit 305 is provided with both buffer 106 and buffer 206, which are each adapted here as a spool or reel. The temporary belt guide 9 is laid down on the field of the cultivation floor 2. The belt 104 runs from the unit 305 across the guide 9 to the reversal device 7 and then back to the mobile unit 305 once more. The guide 9 here can have a double-decker design, for example as explained with the aid of FIG. 4B. The reversal device 7 may be provided with a belt drive unit, if desired. In this example, belt drive units 112 and 212 are shown as possible equipment of the unit 305. As mentioned, one or more of those drive units may also be adapted to drive directly a spool or reel of buffer 106 and/or 206.

The invention claimed is:

1. A belt conveyor system for the transporting of plant containers over a cultivation floor for the removal of plant containers from a field of the cultivation floor and/or for the supplying of plant containers to be set up on a field of the cultivation floor, wherein the belt conveyor system comprises:
    an endless belt on which the plant containers are placeable;
    a mobile unit, provided with a buffer which is adapted to buffer the endless belt, and a drive unit to place the endless belt in operation, which mobile unit is adapted to be placed at a first location with respect to a field of the cultivation floor;
    a reversal device provided with a reversal member, which reversal device is adapted to be placed at a second location with respect to the field of the cultivation floor at a distance from the mobile unit; and
    a temporarily arranged belt guide which is adapted to be placed between the mobile unit and the reversal device on the field of the cultivation floor;
wherein the belt conveyor system has a stowing condition and an operating condition,
wherein, in the stowing condition, the endless belt is buffered in the buffer of the mobile unit, and
wherein, in the operating condition, the endless belt is extended with respect to the mobile unit and lies around the reversal member of the reversal device placed at a distance from the mobile unit, so that an endless belt is produced with a forward running belt section from the mobile unit to the reversal device and a returning belt section from the reversal device to the mobile unit, wherein the reversal device reverses the belt, and wherein the belt runs between the mobile unit and the reversal device across the belt guide, wherein the belt guide comprises a lower row of slide plates to be laid on the cultivation floor, wherein—in use—the lower belt section slides across them, and an upper row of slide plates, to be laid on the lower row of slide plates, wherein—in use—the upper belt section slides across them.

2. The belt conveyor system according to claim 1, wherein the belt guide forms a slide surface, so that a section of the belt slides over the belt guide.

3. The belt conveyor system according to claim 1, wherein the belt guide comprises a row of slide plates to be laid on the cultivation floor, which slide plates, in use, are laid in a row, in their longitudinal direction.

4. The belt conveyor system according to claim 1, wherein, in the operating condition, the forward running and returning belt sections lie horizontally and directly above one another, and wherein only the lower belt section runs across the belt guide, wherein the belt guide comprises a row of slide plates to be laid on the cultivation floor, which slide plates, in use, are laid in a row, in their longitudinal direction.

5. The belt conveyor system according to claim 1, wherein the belt guide is gutter shaped, looking in a transverse cross section, and wherein at least one section of the belt in the operating condition, lies between upward pointing legs of the gutter shape of the belt guide.

6. The belt conveyor system according to claim 1, wherein the lower row of slide plates and the upper row of slide plates are adapted to be vertically nesting, so that the upper row of slide plates engages with the lower row of slide plates.

7. The belt conveyor system according to claim 1, wherein the width of the belt guide is at least equal to the width of the belt.

8. The belt conveyor system according to claim 1, wherein moreover a pull out device is provided, wherein the pull out device is adapted to pull out the belt with regard to the mobile unit in which it is buffered in the stowing condition.

9. The belt conveyor system according to claim 1, wherein, in the embodiment of claim 1, the total length of the belt is greater than 40 metres, or wherein the total length of the belt is greater than 250 metres.

10. A method for the removal of plant containers from a field of a cultivation floor, wherein use is made of a belt conveyor system according to claim 1, wherein the method involves the steps of:
    the placing of the mobile unit of the belt conveyor system, in its stowing condition, next to the field of the cultivation floor,
    the arranging of the belt guide on the field of the cultivation floor,
    the extending of the endless belt,
    the placing of the reversal device on the field of the cultivation floor, at a distance from the mobile unit,
    the placing of the endless belt in operation, so that an endless belt is produced with a forward running belt section from the mobile unit to the reversal device and a returning belt section from the reversal device to the mobile unit,
    the picking up of plant containers from the cultivation floor and the placing of plant containers on the returning belt section, so that the plant containers are taken away from the cultivation floor.

11. A belt conveyor system for the transporting of plant containers over a cultivation floor for the removal of plant containers from a field of the cultivation floor and/or for the bringing of plant containers to be set up on a field of the cultivation floor, wherein the belt conveyor system comprises:
    a belt on which plant containers are placeable;
    a first mobile unit provided with a buffer which is adapted to buffer the belt, and a drive unit to place the belt in operation, which first mobile unit is adapted to be placed at a first location with respect to a field of the cultivation floor;
    a second mobile unit, provided with a buffer which is adapted to buffer the belt, and a drive unit to place the belt in operation, which second mobile unit is adapted to be placed at a second location with respect to a field of the cultivation floor; and
    a temporarily arranged belt guide which is adapted to be placed between the first mobile unit and the second mobile unit on the field of the cultivation floor;
wherein the belt conveyor system has a stowing condition and an operating condition,
wherein, in the stowing condition, the belt is buffered in the buffer of one or both of the first and the second mobile unit, and
wherein, in the operating condition, the belt is extended with respect to at least one mobile unit, in which the belt was buffered, and is pulled toward the other mobile unit and is coupled there to the buffer and the drive unit of that other mobile unit, so that a belt is produced with a single belt section from the one mobile unit to the other mobile unit, and wherein the single belt section runs between the mobile units across the belt guide placed on the cultivation floor.

12. A method for the removal of plant containers from a field of a cultivation floor, wherein use is made of a belt conveyor system according to claim 11, wherein the method involves the steps of:
- the placing of the first and second mobile units of the belt conveyor system, in its stowing condition, at respectively the first and second location with respect to the field of the cultivation floor,
- the arranging of the belt guide on the field of the cultivation floor,
- the extending of the belt from the buffer of at least one mobile unit in which the belt was buffered in the stowing condition and the coupling of the extended belt to the drive unit and buffer of the other mobile unit, wherein during the extending the belt comes to lie on the belt guide,
- the placing of the belt drive unit of one of the mobile units in operation, so that the belt moves to that mobile unit and is buffered in the buffer of that mobile unit,
- the placing of plant containers on the belt, such that the plant containers are transported,
- if the buffer of the mobile unit placed in operation gets full before the intended transport of plant containers in the direction toward that mobile unit is completed, the interrupting of the placing of plant containers on the belt, the halting of the drive unit of the mobile unit whose buffer has become full, and:
  - the placing of the drive unit of the other mobile unit in operation, such that the belt is rewound to the buffer of the other mobile unit, and then the halting of the rewinding and the placing in operation once more of the drive unit of the mobile unit whose buffer has been fully unwound, or
  - the switching of location of the first and second mobile unit, and the placing in operation of the drive unit of the mobile unit whose buffer was fully unwound.

13. A belt conveyor system for the transporting of plant containers over a cultivation floor for the removal of plant containers from a field of the cultivation floor and/or for the supplying of plant containers to be set up on a field of the cultivation floor, wherein the belt conveyor system comprises:
- an endless belt on which the plant containers are placeable;
- a mobile unit, provided with a buffer which is adapted to buffer the endless belt, and a drive unit to place the endless belt in operation, which mobile unit is adapted to be placed at a first location with respect to a field of the cultivation floor;
- a reversal device provided with a reversal member, which reversal device is adapted to be placed at a second location with respect to the field of the cultivation floor at a distance from the mobile unit; and
- a temporarily arranged belt guide which is adapted to be placed between the mobile unit and the reversal device on the field of the cultivation floor;

wherein the belt conveyor system has a stowing condition and an operating condition, wherein, in the stowing condition, the endless belt is buffered in the buffer of the mobile unit, and wherein, in the operating condition, the endless belt is extended with respect to the mobile unit and lies around the reversal member of the reversal device placed at a distance from the mobile unit, so that an endless belt is produced with a forward running belt section from the mobile unit to the reversal device and a returning belt section from the reversal device to the mobile unit, wherein the reversal device reverses the belt, and wherein the belt runs between the mobile unit and the reversal device across the belt guide,
- wherein the belt guide is gutter shaped, looking in a transverse cross section, and wherein at least one section of the belt in the operating condition, lies between upward pointing legs of the gutter shape of the belt guide.

* * * * *